United States Patent [19]
Sidhu et al.

[11] 3,772,926
[45] Nov. 20, 1973

[54] ECCENTRIC DRIVE MECHANISM

[76] Inventors: Mohanjit S. Sidhu; Donald E. Landis, both of Cambridge, Ohio

[22] Filed: Apr. 10, 1972

[21] Appl. No.: 242,413

[52] U.S. Cl. ............................................... 74/116
[51] Int. Cl. ........................................... F16h 29/00
[58] Field of Search...................... 74/116, 125, 118, 74/122

[56] References Cited
UNITED STATES PATENTS

| | | | |
|---|---|---|---|
| 3,086,405 | 4/1963 | Fleming | 74/116 |
| 765,832 | 7/1904 | Hamilton | 74/116 |
| 2,928,359 | 3/1960 | Vogel | 74/116 |
| 2,933,931 | 4/1960 | Lisinski | 74/116 |
| 3,340,744 | 9/1967 | Reichl | 74/125 |
| 3,678,769 | 7/1972 | Holzer | 74/118 |

FOREIGN PATENTS OR APPLICATIONS
936,441   9/1963   Great Britain........................ 74/125

*Primary Examiner*—Manuel A. Antonakas
*Assistant Examiner*—Wesley S. Ratliff, Jr.
*Attorney*—J. T. Cavender et al.

[57] ABSTRACT

A mechanism for minimizing rotational movement of an cyclically-operated actuating member in which an eccentrically mounted cam member is rotatably mounted within a sleeve member. A link secured to an end of the sleeve member restricts the lateral movement of the sleeve member thereby allowing the rotation of the cam member to move the sleeve in a vertical direction which actuates a drive member.

4 Claims, 2 Drawing Figures

PATENTED NOV 20 1973 3,772,926

ECCENTRIC DRIVE MECHANISM

BACKGROUND OF THE INVENTION

This invention relates to a mechanism for minimizing wear between a rotating member and a stationary member in which the stationary member is actuated by and cyclically moved into and out of engagement with the rotating member at a relatively high rate of speed. As disclosed in the concurrently-pending United States patent application of Donald E. Landis et al., Ser. No. 43,815, filed June 5, 1970, now U.S. Pat. No. 3,668,942 and entitled "Indexing Mechanism" and which is also assigned to the assignee of the present invention, a mechanism for indexing a strip of record tags through a printing station includes an arm which is reciprocally rotated through an indexing distance by a rotating cam member. The arm is moved into engagement with the cam member by resilient means upon the deenergizing of an electromagnetic member. When the indexing mechanism is to be disabled, the electromagnetic member is energized which disengages the arm from the cam member. Under normal operating condition, the actuation of the arm by the cam member and the engaging and disengaging of the arm and the cam member produces wear between the two components. Since the indexing distance that the arm member is rotated is dependent on the contact surface between the arm and the cam member, the wearing of the contact surface of the arm changed the indexing distance through which the arm moved which disabled the operation of the printer mechanism.

SUMMARY OF THE INVENTION

Therefore it is an object of this invention to provide a mechanism which will allow the rotation of a cam member to drive an actuating arm a predetermined distance without producing any appreciable wear between the cam member and the arm. In order to accomplish this purpose, there is provided a sleeve in which the cam member is rotatably mounted. A link member secured at one end is attached to the sleeve at its other end. Rotation of the cam member will result in the movement of the sleeve in a vertical direction with very little lateral movement.

GENERAL DESCRIPTION

Figure 1:
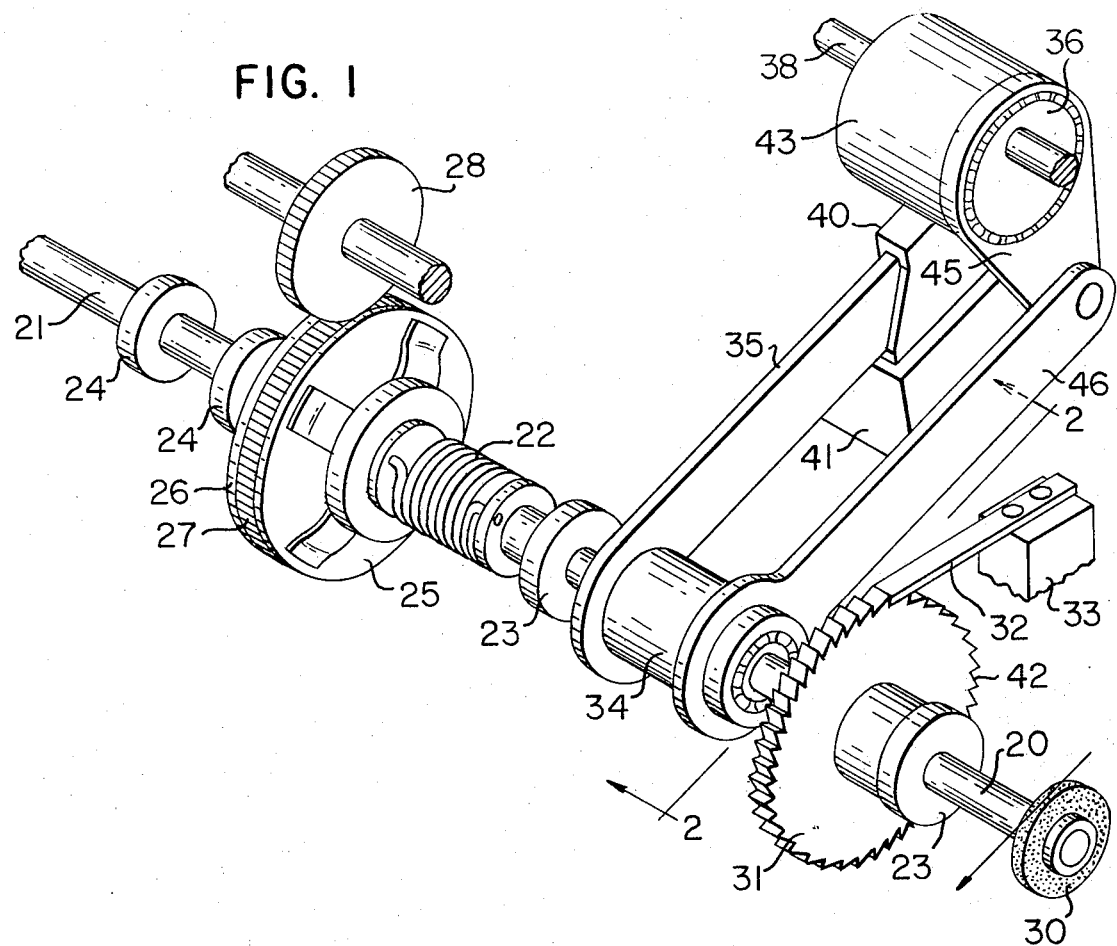
FIG. 1 is an oblique view of the indexing mechanism utilizing the present invention.

Referring to FIG. 1, there is shown an oblique view of the indexing mechanism disclosed in the previously cited co-pending application Ser. No. 43,815 which includes a two-part drive shaft 20, 21 joined together by means of a spring clutch 22. The drive shaft portion 20 is rotatably supported by bearing members 23, while the drive shaft portion 21 is supported by bearing members 24. Secured to the drive shaft portion 21 are a pair of outer discs 25, 26 of a slip clutch which engages a center disc 27 rotatably mounted on the shaft portion 21. The perimeter of the disc 27 comprises a plurality of gear teeth which are engaged by a rotating gear member 28. The contact surface between the discs 25, 26 and disc 27 provide a frictional engagement with each other. Continuous rotation of the gear member 28 in a direction counter-clockwise as viewed in FIG. 1 will rotate the discs 25–27 inclusive in a clockwise direction, thus winding up the spring clutch which transmits this torque to the drive shaft portion 20.

Figure 2:
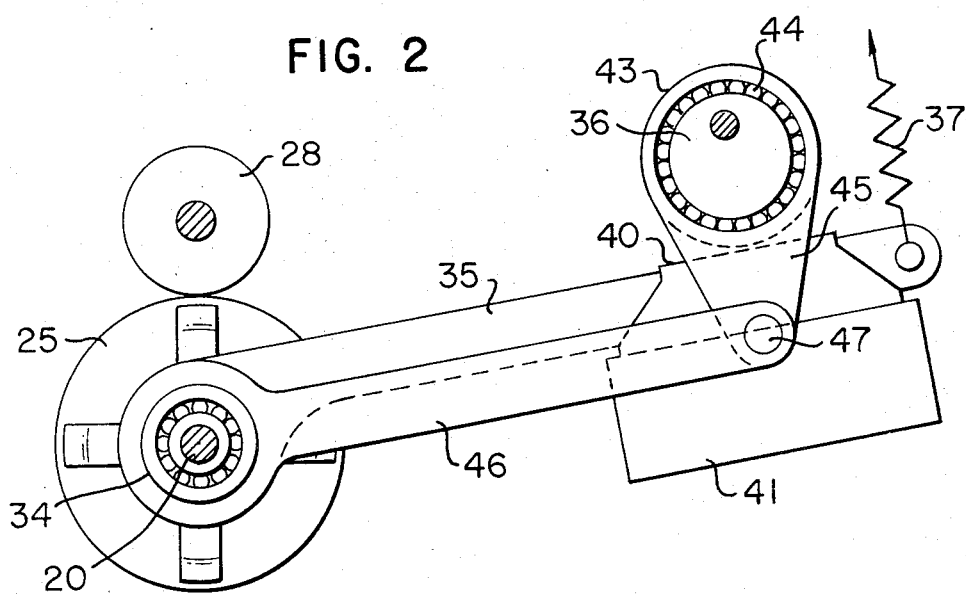
FIG. 2 is a sectional view taken on lines 2—2 of FIG. 1.

Secured to one end of the drive shaft 20 is a drive wheel 30 which engages and drives a strip of record tags (not shown). Also secured to the drive shaft is a ratchet wheel 31 which is engaged by a pawl 32 mounted on a support member 33. Mounted on the drive shaft 20 is a roller clutch 34 which is connected to one end of a cam follower arm 35, the other end of which is normally urged into engagement with a cam member 36 by a spring 37 (FIG. 2). The cam member 36 is secured to and driven by a cam shaft 38.

Secured to the end of the cam follower arm 35 is an armature member 40 positioned adjacent an electromagnetic control member 41. Upon rotation of the cam member 36 by the cam shaft 38, the arm 35 is rocked clockwise and then counter-clockwise about the drive shaft 20. When the arm 35 is in its full counter-clockwise position, the armature 40 is in such close proximity with the electromagnetic member 41 that, upon the energizing of the magnet at this time, the armature will be latched thereby holding the cam follower arm 35 from engagement with the cam member 36.

When it is desired to move a record tag into and through a printing position, the magnet 41 will be deenergized thus allowing the spring 37 to move the armature 40 and the cam follower arm 35 into engagement with the constantly rotating cam member 36. This engagement will rock the arm 35 clockwise and then counter-clockwise about the shaft 20 as described previously. The counter-clockwise movement of the arm 35 will actuate the roller clutch 34 to engage the shaft portion 20, thus turning the shaft 20 in a likewise direction commensurate with the movement of the arm 35. This rotation of the shaft 20 is against the torque exerted on the shaft by the spring clutch 22 in the manner described previously. The counter-clockwise rotation of the shaft 20 will also rotate the ratchet wheel 31 and the drive wheel 30, thus moving the record tag a predetermined distance. Upon the clockwise rotation of the arm 35, the roller clutch 34 will be disengaged from the shaft 20 while the ratchet pawl 32 will engage a tooth portion 42 of the ratchet wheel thus stopping the clockwise rotation of the ratchet wheel 31 which is normally urged in a clockwise direction by the spring clutch 25. Thus the length of feed of the record tag by the drive wheel 30 is controlled by the number of teeth 42 on the ratchet wheel. The record tag which is moved by the drive wheel 30 is disclosed in the concurrently-pending United States patent application of Clarence L. Jones, Ser. No. 28,624, filed Apr. 15, 1970, now U.S. Pat. No. 3,687,256 and entitled "Optical Bar Code Parallel Printer" and which is also assigned to the assignee of the present invention. The record tag has printed thereon a plurality of contiguous color bars representing data. The printing of the bars on the record tag requires that the record tag be stepped through the tag printer at the rate of 120 steps per second. This high speed cycling of the arm 35 by the cam 36 resulted in the wearing of the contacting surface of the armature 40 and the cam to the point that within a few hours of operation, the arm was not rocked in a counter-clockwise direction sufficiently to step the ratchet wheel 31 and the drive wheel 30. In order to overcome this condition, a sleeve 43 was rotatably mounted by means of roller bearings 44 on the cam 36. One end of the sleeve 43 has a lower extension 45 to which is rotatably attached one end of a link member 46 by means of a stud 47. The other end of the link 46 is rotatably mounted on the roller clutch 34. Upon the eccentric rotation of the cam member 36 by the cam shaft 38, the sleeve 43 will move in an elliptical path whose vertical component is equal to the eccentric vertical movement of the cam member 36 due to the point of engagement of the sleeve extension 45 by the link 46 being in the same vertical plane as the center of rotation of the cam member. Because of the mounting of the link 46 in a direction perpendicular to the vertical plane of movement of the cam member, the horizontal movement of the sleeve 43 is restricted resulting in a rotational movement of the sleeve 43 on the armature 40 which is very slight during a complete rotation of the cam member 36. This length of rotational movement of the sleeve 43 on the armature 40 eliminated the problem of wear, thus allowing the indexing mechanism to function for its intended purpose and within a proper economic framework.

What is claimed is:

1. A drive mechanism for cyclically rotating a lever member through a predetermined distance comprising
   a. an eccentrically mounted cam member positioned adjacent the lever member, said cam member adapted to move in a vertical and horizontal direction;
   b. a sleeve member rotatably mounted on said cam member and adapted for vertical and horizontal movement, said sleeve member having a depending portion extending in the plane of vertical movement of said cam member and said sleeve member;
   c. means engaging the lever member for normally urging the lever member into engagement with the sleeve member;
   d. means for restricting the horizontal movement of the sleeve member on the lever member including a link member engaging said depending portion of the sleeve member and rotatably mounted in a direction substantially perpendicular to the vertical movement of said cam member;
   e. and means for rotating said cam member whereby the sleeve member will be moved in a vertical direction to cyclically actuate the lever member through a predetermined distance.

2. The drive mechanism of claim 1 in which the link member and the lever member are rotatably mounted on the same axis and extend in substantially parallel directions whereby the horizontal movement of the sleeve member is substantially less than the horizontal movement of said cam member.

3. In an actuating mechanism which includes an eccentrically mounted cam member moving in a horizontal and vertical direction for actuating one end of a rotatably mounted lever member about its axis of rotation, means for restricting the horizontal movement of said cam member on the lever member including
   a. a sleeve member rotatably mounted on said cam member for movement in a horizontal and vertical direction upon rotation of said cam member, said sleeve member engaging said lever member and having a depending portion extending in the plane of vertical movement of said sleeve member and the cam member;
   b. a rotatably mounted link member extending in a direction perpendicular to the vertical movement of said sleeve member, said link member rotatably engaging the depending portion of said sleeve member for restricting the horizontal movement of said sleeve member;
   c. and means for rotating the cam member whereby the sleeve member is moved in a vertical direction commensurate with the movement of the cam member thereby rotating the lever member a like distance.

4. The mechanism of claim 3 in which the link member and the lever member are rotatably mounted on the same axis and extend in parallel directions, whereby the horizontal movement of the sleeve member is substantially less than the horizontal movement of said cam member.

* * * * *